Nov. 16, 1971  S. TARADASH ET AL  3,620,025
INTERLOCKING BOLTLESS LINING AND SUPPORT STRUCTURE
FOR UNDERGROUND OPENINGS
Filed Jan. 22, 1970  2 Sheets-Sheet 1

INVENTORS
Samuel Taradash &
Nicholas Chlumecky

United States Patent Office 3,620,025
Patented Nov. 16, 1971

3,620,025
INTERLOCKING BOLTLESS LINING AND SUPPORT STRUCTURE FOR UNDERGROUND OPENINGS
Samuel Taradash, Liberty Township, Trumbull County, and Nicholas Chlumecky, Portland, Ohio, assignors to Commercial Shearing & Stamping Company
Filed Jan. 22, 1970, Ser. No. 5,046
Int. Cl. E21d *11/00*
U.S. Cl. 61—45 R                4 Claims

ABSTRACT OF THE DISCLOSURE

A boltless interlocking lining and support structure for underground openings is provided made up of a plurality of segments of generally quadrilateral shape having end edges and side edges, the end edges of one such segment abutting the end edges of the next adjacent segments in generally circumferential relationship, and the side edges being provided with at least one indentation bounded by an outwardly extending lug at each end, said lugs of one segment interfitting within the indentation of an adjacent side-by-side segment.

---

This invention relates to interlocking boltless lining and support structures for underground openings and particularly to a method of supporting and lining tunnels and shafts made by underground mining or by open trenching.

Tunnels and shafts such as subways, vehicular tunnels and underwater tubes and like structures must be provided with a supporting and preferably a water-proof lining. Presently, many tunnels and shafts are lined with material which consists mostly of segmental rectangular shapes made of steel, cast iron or other materials such as concrete. An accurate tunnel diameter has to be maintained as for instance, in vehicular tunnels or water tunnels and the segmental lining must be held together at joints. With present practice, this is done by bolting flanged structures together which is very costly and time consuming because the holes in the flanges of the segments have to be carefully matched up as otherwise the bolts cannot be inserted and tightened. Another problem is the tightening of the bolts on all the flanged joints of presently used segmental linings. Such tightening of bolts becomes very laborious and is difficult particularly in the upper portion of the tunnel lining. Furthermore, the flanges of bolted linings have to be carefully machined or ground to accurate dimension, which makes the tunnel lining expensive. The bolted method of assembling a lining in the tunnel is also not suitable for an automated assembly for the elimination of slow manual work.

In addition, with flange type lining segments, it is impossible to obtain a tunnel lining which is smooth towards the inside of the tunnel and thorough cleaning up of the invert of the tunnel is quite difficult because of the obstructions which are caused by the flanges which are bolted together. In summary, the present art of lining a tunnel is quite laborious and costly where a conventional bolted construction is used.

It is an object of this present invention to provide a novel and significant improvement over these presently used methods which are described above. It is a further object of this invention to provide a method whereby the lining assembly is done without the need to bolt the lining together. It is a still further object of this invention to provide a tunnel lining method whereby the boltless assembly of segments will assure that the longitudinal joints of the lining are held tightly together. It is another object of this invention to provide a tunnel lining method whereby the horizontal joints remain essentially in alignment. It is a further object of this invention to provide a tunnel lining which can be made flexible while being a boltless assembly. Another object of this invention is to provide a tunnel lining which is smooth inside and outside, which facilitates easy clean up of the tunnel invert. It is still another object of this invention to provide a tunnel lining which is the final finished lining upon installation and which does not require a temporary lining prior to its installation. It is a further object of this invention to provide a tunnel lining for which each segment is of equal cross-sectional shape, the cross-section being taken at right angle to the longitudinal axis of the tunnel and in which the lining does not require a special key piece for assembly of the lining in the tunnel.

Other objects, purposes and advantages of this invention will be apparent to those skilled in the art by a further consideration of the following description and the accompanying drawings in which.

Figure 1:
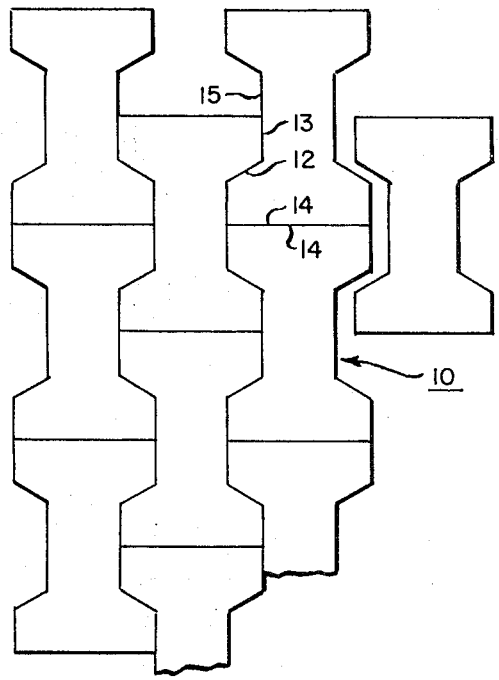
FIG. 1 shows the developed shape of a tunnel lining according to this invention which is boltless and maintains longitudinal joints which are tightly drawn together.

Referring to the drawings and more particularly to FIG. 1 we illustrate the developed lining segment 10 for a tunnel of circular or other cross-section. Segments 10 are assembled in interlocking relationship with ends 14 abutting and angular base shoulder 12 abutting and with the base sides 13 of one line of segments abutting the side edges 15 of the yokes of the next adjacent line of segments to form an interlocked assembly of segments.

Figure 3:
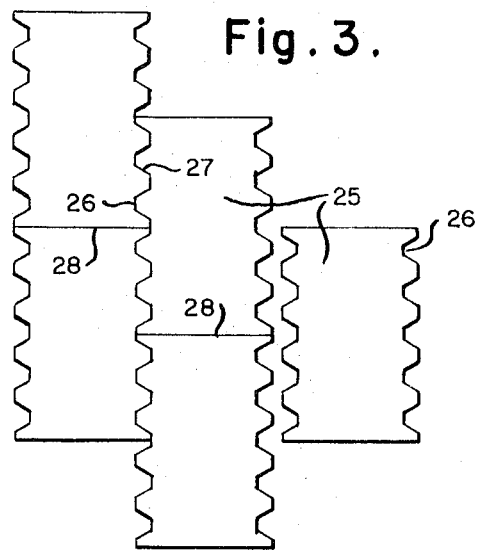
FIG. 3 shows the developed shape of a third embodiment of tunnel lining according to our invention which is boltless and has a plurality of indentations in the vertical joint to prevent separation of horizontal joints.
Figure 2:
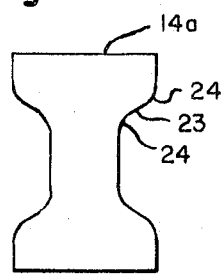
FIG. 2 shows a second embodiment of tunnel lining according to our invention which may be assembled as in FIG. 1.

Alternatively the lining segment instead of having an angular base shoulder as shown in FIG. 1 may have a shoulder 23 with a short curve 24 at each end joining the shoulder with the adjacent edge. Such a segment is illustrated in FIG. 2. FIG. 3 shows the shape of a lining segment 25 which has relatively small indentations 26 in the vertical joint 27 to prevent expansion or separation of the longitudinal joint 28 being a different method of assembly from that shown by FIG. 1 but performing a similar function.

Figure 4:
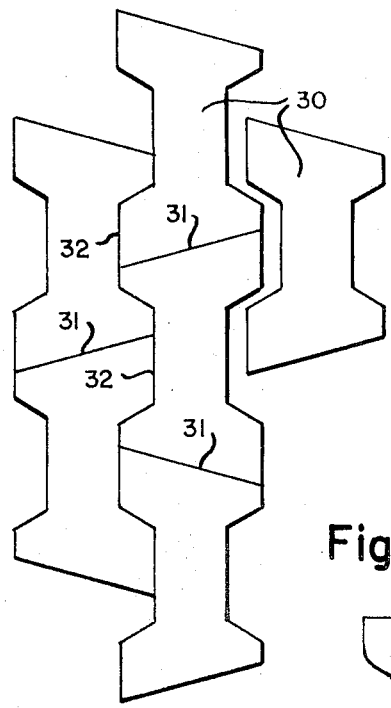
FIG. 4 shows the developed shape of a fourth embodiment of tunnel lining similar to FIG. 1, but with longitudinal joints at an angle with the horizontal.

FIG. 4 illustrates another embodiment of lining segment 30 where the longitudinal joint 31 is at an angle with the longitudinal axis of the tunnel, whereas the vertical joint 32 is essentially the same as in FIG. 1.

Figure 5:
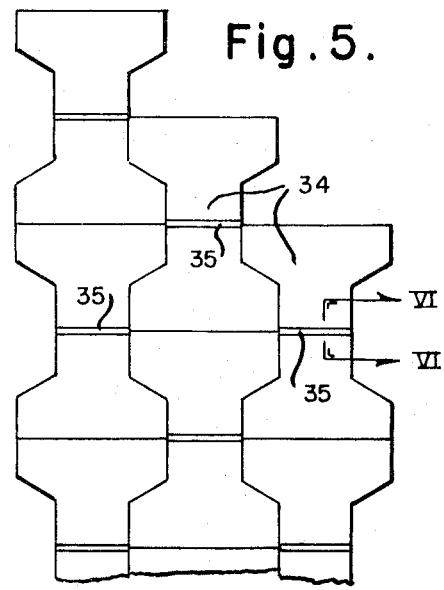
FIG. 5 shows the developed shape of a fifth embodiment of tunnel lining similar to FIG. 1, but with a flexible joint in line with the longitudinal joint.
Figure 6:
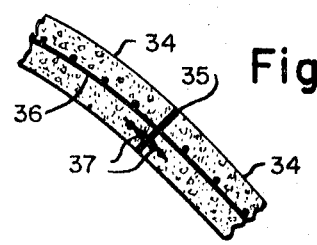
FIG. 6 is a section on the line VI—VI of FIG. 5.

FIG. 5 shows a lining segment 34 similar to FIG. 1 but with flexible center 35 to allow for slight flexibility of the installed lining. Such flexibility is needed for cases where the lining is installed close to the tunnel face a short time after the excavation is made. In such cases, slight but powerful adjustments of the rock or earth to be supported take place and if the lining is too rigid, it may become damaged. Flexible center 35 is also shown in section in FIG. 6. For strength in tension segments 34 made from concrete or other suitable materials contain reinforcing steel 36. For flexibility an elastomer 35 with sealing anchors 37 is installed at the center of segment 34. Slight bending of segment 34 will then cause compression or bending of elastomer 35 and will eliminate possible cracking of the lining segment which is otherwise inflexible.

Figure 7:
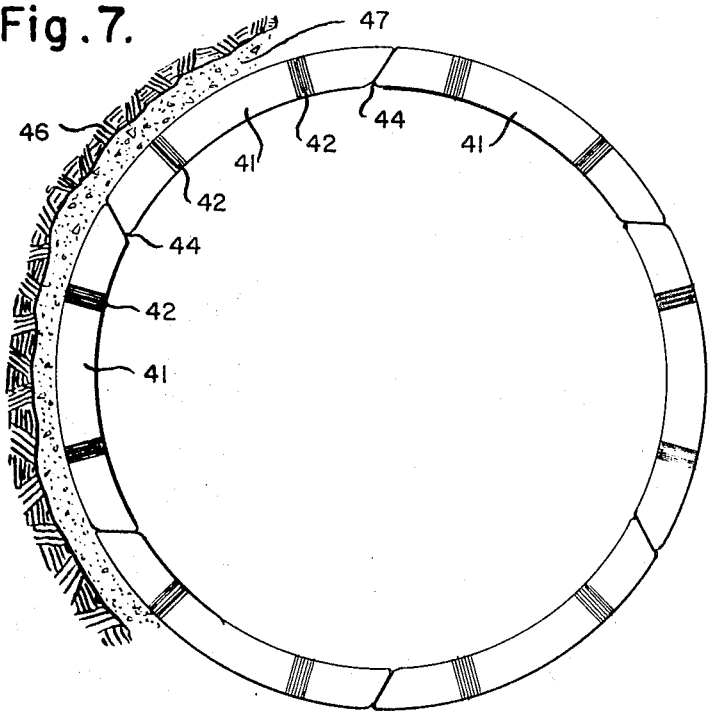
FIG. 7 shows a circular tunnel cross-section according to our invention with joints which do not require a key piece for the assembly of a segment ring.
Figure 8:
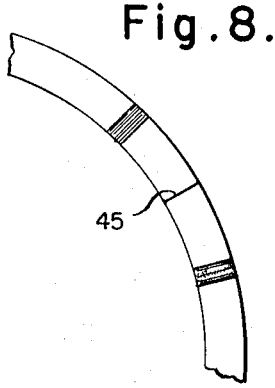
FIG. 8 shows a fragmentary cross-section of a circular tunnel with another form of joint.

FIG. 7 shows the typical cross-section of a circular tunnel. Joints 44 are of a shape whereby the ring of segments 41 can be assembled in the tunnel without need for a special key piece. All segments 41 can be of the same shape. The location of angular shaped joint 42 (similar to joint 12 of FIG. 1) is shown by the hatched area of the ring of segments 41. FIG. 8 shows square joint 45 which can be used with a segment shape as shown by FIG. 4. The void around the lining between the lining and the earth 46 is filled with grout 47.

Figure 9:
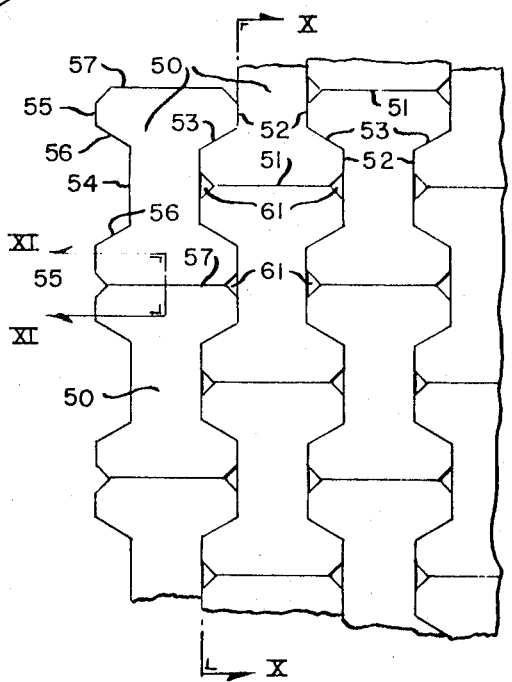
FIG. 9 shows a method of a joint construction and connection which assures proper load transfer from one segment to the next according to our invention.
Figure 10:
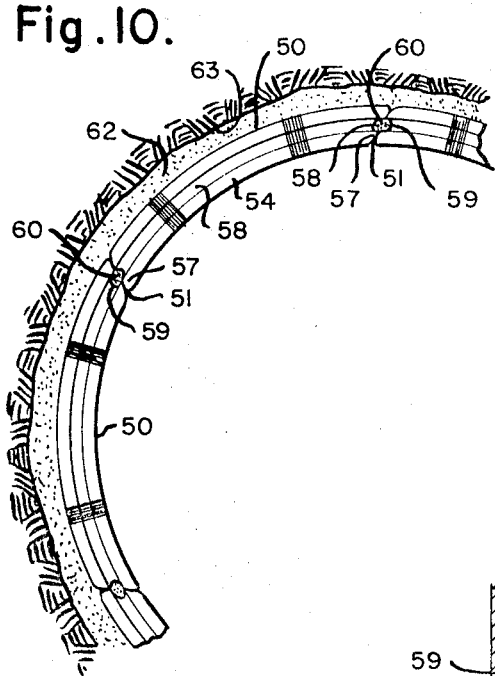
FIG. 10 is a fragmentary section on the line X—X of FIG. 9.
Figure 11:
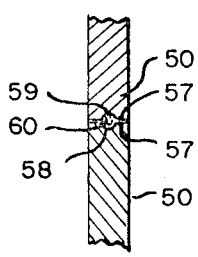
FIG. 11 is a fragmentary section on the line XI—XI of FIG. 9.

FIG. 9 shows a method of sealing of joints and assuring load transfer from one segment 50 to the next across longitudinal joints 51 and vertical joints 52 and angular joints 53. Joints are formed by meeting edges 54, 55, 56 and 57 of segments 50. As shown by FIG. 10, edges 54 are provided with groove 58. This groove is also located in edges 57 which forms joints 51. A cross-section of assembled joints 51 and 52 is shown by FIG. 11. The grooves 58 meet to form opening 59 which is pumped full of mortar, grout or other structurally strong sealing material 60 to bond joints 51, 52 and 53 together and to form a stable structure. The mortar, grout or other structurally strong material 60 is pumped into opening 59 through triangular openings 61 at the corners of segments 50. These same triangular openings 61 go through the lining, where required, to fill voids 62 between the limits of the tunnel excavation 63 and lining 50.

While we have illustrated certain preferred practices and embodiments or our invention in the foregoing specification, it will be understood that this invention may be otherwise embodied within the scope of the following claims.

We claim:
1. An interlocking boltless lining and support structure for underground openings comprising a plurality of segments of generally quadrilateral shape having end edges and side edges, the end edges of one such segment abutting the end edges of the next adjacent segments in generally straight line freely movable relation and the side edges being provided with at least one indentation bounded by an outwardly extending lug at each end, said lugs of one segment interfitting within the indentation of an adjacent side-by-side segment, at least a part of said segments being formed in two pieces connected by a resilient member.

2. An interlocking boltless lining as claimed in claim 1 wherein the side edges are provided with a single indentation and the projecting lugs are each equivalent to one half the area of the indentation whereby two lugs of adjacent segments fill the indentation.

3. An interlocking boltless lining as claimed in claim 1 wherein the end edges and side edges are provided with sealant grooves.

4. An interlocking boltless lining as claimed in claim 1 having an opening in at least one of said segments whereby grout may be pumped through the lining to surround the same.

References Cited

UNITED STATES PATENTS

| | | | |
|---|---|---|---|
| 1,336,789 | 4/1920 | Sheen | 61—45 R |
| 1,460,516 | 7/1923 | Sheen | 61—45 R |
| 1,866,242 | 7/1932 | Warner et al. | 61—45 R |
| 1,889,563 | 11/1932 | O'Rourke | 61—45 R |
| 1,969,810 | 8/1934 | McAlpine | 61—45 R |

FOREIGN PATENTS

| | | | |
|---|---|---|---|
| 115,744 | 1/1930 | Austria | 61—45 R |
| 763,991 | 12/1956 | Great Britain | 61—45 R |
| 620,606 | 5/1961 | Italy | 61—45 R |

DENNIS L. TAYLOR, Primary Examiner